United States Patent
Gref et al.

(10) Patent No.: US 11,876,204 B2
(45) Date of Patent: Jan. 16, 2024

(54) BATTERY HOUSING FOR A MOTOR VEHICLE BATTERY

(71) Applicant: Dr. Ing. h.c. F. Porsche Aktiengesellschaft, Stuttgart (DE)

(72) Inventors: Markus Gref, Stuttgart (DE); Fabian Kopold, Kämpfelbach (DE); Dominik Hainke, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 243 days.

(21) Appl. No.: 17/391,201

(22) Filed: Aug. 2, 2021

(65) Prior Publication Data

US 2022/0052394 A1  Feb. 17, 2022

(30) Foreign Application Priority Data

Aug. 12, 2020 (DE) .................. 10 2020 121 205.4

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC ........... H01M 10/6556; H01M 10/613; H01M 10/625; H01M 10/6554; H01M 10/6567;
(Continued)

(56) References Cited

U.S. PATENT DOCUMENTS

| 4,508,793 A | * | 4/1985 | Kumata | ............ H01M 8/04014 |
| | | | | 429/458 |
| 8,110,316 B2 | * | 2/2012 | Oda | .................... H01M 8/2457 |
| | | | | 429/512 |

(Continued)

FOREIGN PATENT DOCUMENTS

| CN | 111525213 A | 8/2020 | | |
| DE | 102018212627 A1 | * | 1/2020 | .......... H01M 10/613 |
| WO | 2012126111 A1 | 9/2012 | | |
| WO | WO-2013056938 A1 | * | 4/2013 | ........ H01M 10/0413 |

*Primary Examiner* — Kaity V Chandler
(74) *Attorney, Agent, or Firm* — RatnerPrestia

(57) ABSTRACT

A battery housing for a motor vehicle battery of a motor vehicle. The housing includes a housing body which forms at least one planar housing wall, a cooling plate which bears on an outwardly facing surface of the housing wall and which serves for temperature control of the motor vehicle battery, and an attachment projection which projects in a plane of the housing wall. The attachment projection has at least one attachment opening which communicates with a cooling channel formed in the cooling plate. The indirect fluidic connection of the cooling channel of the cooling plate via the attachment openings of the attachment projection makes it possible for protrusion of an attachment system for a coolant hose to be avoided and for the installation space requirement perpendicular to the surface of the housing wall to be minimized, with the result that an installation space-saving motor vehicle battery is made possible.

10 Claims, 3 Drawing Sheets

Figure 1:
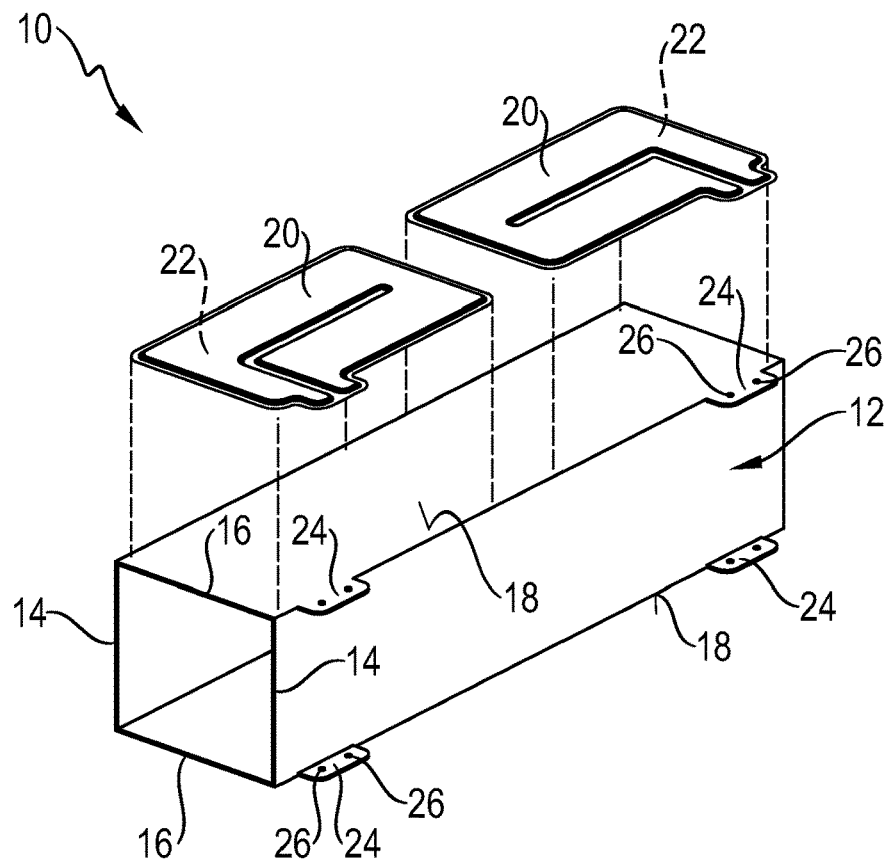

(51) Int. Cl.
  *H01M 10/625*    (2014.01)
  *H01M 10/6567*   (2014.01)
  *H01M 10/6554*   (2014.01)
  *H01M 50/103*    (2021.01)

(52) U.S. Cl.
  CPC .................. *H01M 10/6554* (2015.04); *H01M 10/6567* (2015.04); *H01M 50/103* (2021.01)

(58) Field of Classification Search
  CPC ............ H01M 50/103; H01M 10/647; H01M 10/6568; H01M 50/209; H01M 50/249; H01M 50/244; H01M 50/271; Y02E 60/10
  See application file for complete search history.

(56) References Cited

U.S. PATENT DOCUMENTS

| | | | |
|---|---|---|---|
| 8,835,038 B2 | 9/2014 | Abels et al. | |
| 2012/0107663 A1* | 5/2012 | Burgers | H01M 10/6556 429/120 |
| 2012/0183823 A1* | 7/2012 | Von Borck | H01M 10/663 429/81 |
| 2013/0157089 A1* | 6/2013 | Miyatake | H05K 7/20509 361/702 |
| 2015/0082821 A1* | 3/2015 | Ganz | F25B 5/00 429/120 |
| 2019/0074525 A1* | 3/2019 | Tomana | H01M 8/0276 |
| 2019/0386358 A1* | 12/2019 | Chen | H01M 10/615 |
| 2021/0148639 A1* | 5/2021 | Graves | H01M 10/6556 |
| 2023/0006281 A1* | 1/2023 | Sonnenberger | F28F 9/0248 |

* cited by examiner

BATTERY HOUSING FOR A MOTOR VEHICLE BATTERY

CROSS-REFERENCE TO RELATED APPLICATION

This application claims priority to German Patent Application No. 10 2020 121 205.4, filed Aug. 12, 2020, the content of such application being incorporated by reference herein in its entirety.

FIELD OF THE INVENTION

The invention relates to a battery housing for a motor vehicle battery, with the aid of which battery cells for forming the motor vehicle battery can be accommodated and temperature-controlled, in particular cooled.

BACKGROUND OF THE INVENTION

WO 2012/126111, which is incorporated herein by reference, disclosed a cuboidal battery housing for a motor vehicle battery, for the cooling of which battery a thin cooling plate with a cooling channel conducting a cooling medium can be mounted on a top side of the battery housing, wherein attachment pieces communicating with the cooling channel project from a narrow side of the cooling plate, the cross section of which, on both sides, projects beyond the thickness of the narrow side of the cooling plate.

In view of the foregoing, there is a constant need to reduce the installation space of motor vehicle batteries.

SUMMARY OF THE INVENTION

It would be desirable to present measures which make possible an installation space-saving motor vehicle battery.

Preferred configurations of the invention are specified in the following description, and these can constitute an aspect of the invention individually in each case or in combination.

One embodiment relates to a battery housing for a motor vehicle battery of a motor vehicle that has a housing body which forms at least one planar housing wall, has a cooling plate which bears on an outwardly facing surface of the housing wall and which serves for temperature control of the motor vehicle battery, and has an attachment projection which projects in a plane of the housing wall, wherein the attachment projection has at least one attachment opening which communicates with a cooling channel formed in the cooling plate.

The attachment projection is provided outside an interior space of the housing body, which interior space is provided for accommodating battery cells, with the result that the attachment projection cannot impede the accommodation of the battery cells. The at least one attachment opening provided in the attachment projection may be part of a fluidic supply section via which a coolant is fed to the cooling channel or is discharged from the cooling channel. The cooling channel can, via the attachment projection, be connected to a cooling circuit through the housing body without it being necessary for this purpose for lines of the cooling circuit to be led through the interior space, provided for the battery cells, of the housing body. Due to the material thickness of the attachment projection, which corresponds in particular to the material thickness of the housing wall, a coolant hose can be attached in a correspondingly offset manner, with the result that the coolant hose and/or an attachment piece for attaching the coolant hose do(es) not need to project beyond the outer side, facing away from the surface of the housing wall, of the cooling plate. A gain in installation space through a particularly thin cooling plate is not impeded by a projecting part of an attachment system for a coolant hose. Instead, the attachment system offset via the material thickness of the attachment projection can be provided entirely in a common height range with the rest of the housing body, for which installation space is already left within a motor vehicle anyway. The indirect fluidic connection of the cooling channel of the cooling plate via the attachment openings of the attachment projection makes it possible for protrusion of an attachment system for a coolant hose to be avoided and for the installation space requirement perpendicular to the surface of the housing wall to be minimized, with the result that an installation space-saving motor vehicle battery is made possible.

In particular, the cooling channel is formed in a cooling plane which is substantially parallel to the surface of the housing wall, wherein the cooling channel is connected to the respective attachment opening via connecting openings which run transversely with respect to the cooling plane. The cooling plane may be formed for example by two sheets which are connected, in particular adhesively bonded and/or welded, to one another and between which, by way of suitable embossments, the cooling channel is formed. In a start region and an end region of the cooling channel, the respective connecting openings may be provided as a material cutout in the sheet bearing on the surface of the housing wall. The connecting openings may be aligned substantially with the in each case assigned attachment opening of the attachment projection and preferably be formed in a substantially mutually corresponding manner. The cooling channel can in this way continue at the inlet side and outlet side through the connecting openings of the cooling plate and the attachment openings of the attachment projection, in particular before an attachment system, joining the attachment projection, for the attachment of a coolant hose or some other line is provided. The cooling fluid can, from the cooling channel, which is situated in the plane of the cooling plate, come from a common height range with the rest of the housing body and be discharged. If the housing wall provided with the cooling plate is a base or a top of the housing body, it is possible in particular for an extent of the battery housing in a vertical Z direction to be minimized.

Preferably, on a bottom side, facing away from the cooling plate, of the attachment projection, there is connected in each case one attachment piece which is connected to the respective attachment opening and which serves for attaching a fluid line. The attachment piece can in this way project into a common height range with the rest of the housing body, with the result that, due to the attachment piece, no additional installation space has to be left above the cooling plate, bearing on the surface of the housing wall, for the attachment piece. In this way, the attachment piece is not arranged in a common plane with the cooling plate, but rather is oriented substantially perpendicularly to the plane of the cooling plate. A coolant hose, or other line, departing from the attachment piece can consequently likewise be provided in a common height range with the rest of the housing body, with the result that it is also possible for a line infrastructure of a cooling circuit supplying coolant to the cooling plate to be installed in an installation space-saving manner. In particular, an installation space requirement in a vertical Z direction can be minimized.

Particularly preferably, for attaching a coolant hose which can be attached substantially perpendicularly to the cooling plane of the cooling plate, the attachment piece is of straight form. In this way, the coolant hose can be led away from the attachment piece perpendicularly to the cooling plate and to the cooled housing wall, with the result that the coolant hose can run in a common height range with the rest of the housing body. If appropriate, the coolant hose can be deflected, for example through approximately 90°, so that the coolant hose can run in a height-offset manner with respect to the cooling plate and to the cooled housing wall along a side wall of the housing body that departs from the cooled housing wall.

Figure 5:
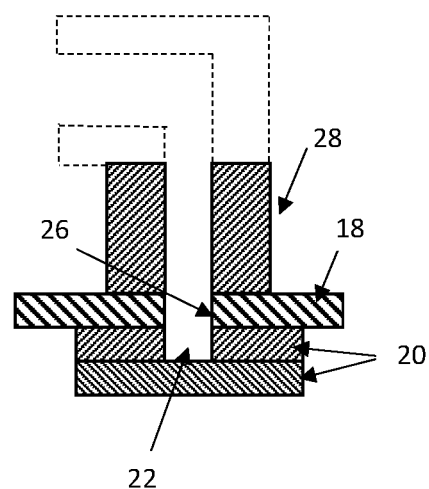

In a further embodiment, it is provided that, for attaching a coolant hose which can be attached substantially parallel to the cooling plane of the cooling plate and substantially perpendicularly to a projection direction of the attachment projection, the attachment piece is of angled form (see, e.g., the broken line embodiment shown in FIG. 5). In this way, it is not necessary for the coolant hose to be deflected through 90° in order to allow the coolant hose to run in a height-offset manner with respect to the cooling plate and to the cooled housing wall along a side wall of the housing body that departs from the cooled housing wall. Preferably, the angled deflection of different attachment pieces at different height levels, that is to say at different distances from the plane of the cooled housing wall, is provided, so that a supply line and a return line for the cooling channel of the cooling plate that are formed by in each case one coolant hose can be routed so as to be made to pass one another and in an automatically installation space-saving manner. For example, the coolant hose provided for the supply line and the coolant hose provided for the return line can be routed, so as to be arranged one above the other, along a side wall of the housing body that departs from the cooled housing wall. In this way, it is also possible to keep low an installation space requirement in the horizontal direction, that is to say in the X direction and/or in the Y direction.

In particular, the same housing wall has two or more different, in particular mutually offset, attachment projections for attaching two or more different, separately formed cooling plates. This allows the same housing wall to be cooled by different cooling plates which are operated independently of one another, whereby a different cooling requirement along a longitudinal direction of the housing body can be taken into account and tackled in an energy-efficient manner.

Preferably, two mutually offset housing walls connected to one another via connecting walls, said housing walls extending in particular in a substantially parallel manner with respect to one another, are provided, wherein both housing walls have at least one attachment projection which projects in the respective plane of the housing wall, and, on both outwardly facing surfaces of the respective housing wall, at least one cooling plate bearing on the surface of the housing wall is provided. For example, the two cooled housing walls may form a base and a top of the housing body, which are put together via the connecting walls to form a cuboidal housing body. Here, there is in particular a projection at the same connecting wall of the at least one attachment projection of the respective cooled housing walls. Since it is necessary anyway for an installation space to be left for the attachment system and the attached lines for one cooled housing wall, this installation space can additionally also be used for the further cooled housing wall. Despite the doubling of the cooling power, the installation space requirement is increased at most in a disproportionately low manner.

Particularly preferably, all the attachment projections project in only exactly one projection direction. All the attachment projections, connecting systems and/or attached lines can be concentrated in a common installation space range even in the case of differently cooled housing walls and/or differently provided cooling plates, with the result that the installation space requirement laterally beside the housing wall can be minimized.

In particular, for the feeding of coolant into the cooling channel of the cooling plate and for the discharge of coolant from the cooling channel of the cooling plate, a common attachment projection or separate attachment projections spaced apart from one another is/are provided. Depending on the running of the cooling channel that is provided for the cooling plate, the feeding and the discharge may be realized at positions close to one another in a common attachment projection or spaced apart from one another in separate attachment projections. The material use for the attachment system of the cooling channel can consequently be kept low without it being necessary for this purpose to make structural specifications which impair the cooling efficiency for the running of the cooling channel.

Preferably, excluding the at least one attachment projection, the housing body is of cuboidal form. The housing body consequently has a simple basic shape, which can be inexpensively produced. For example, the housing body can be produced by extrusion and cut to length according to a desired longitudinal extent, and the attachment projections can be integrally formed at a later stage if the at least one attachment projection is not part of a projection which is continuous in the longitudinal direction.

BRIEF DESCRIPTION OF THE DRAWING FIGURES

Figure 2:
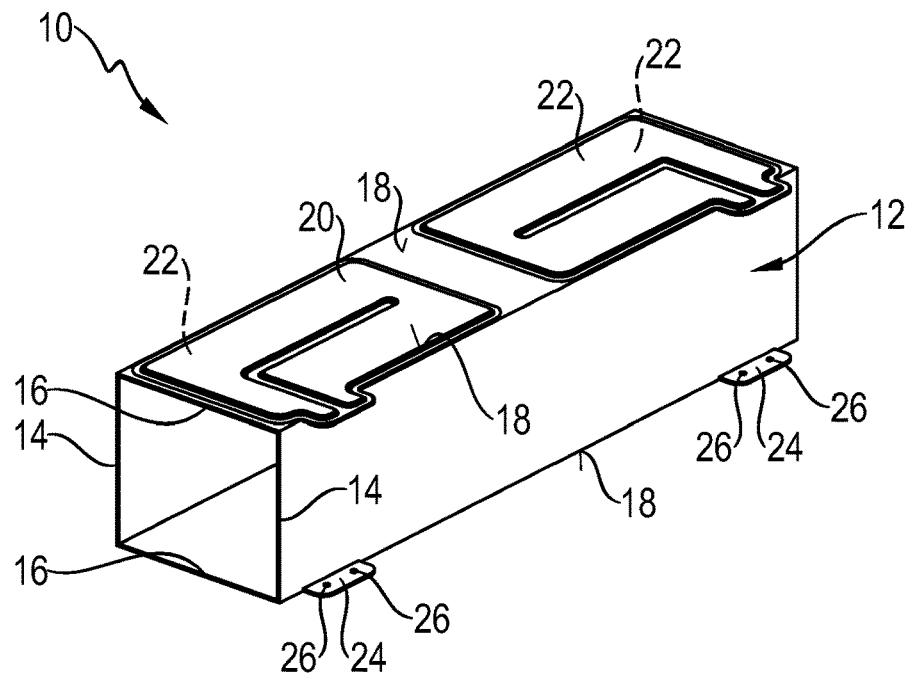
Figure 3:
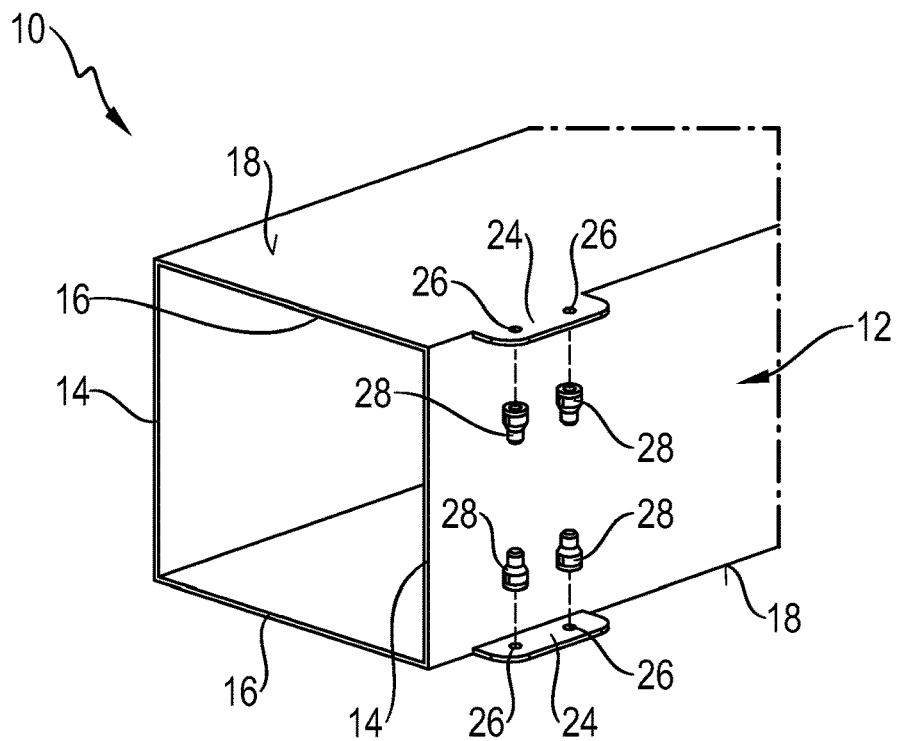
Figure 4:
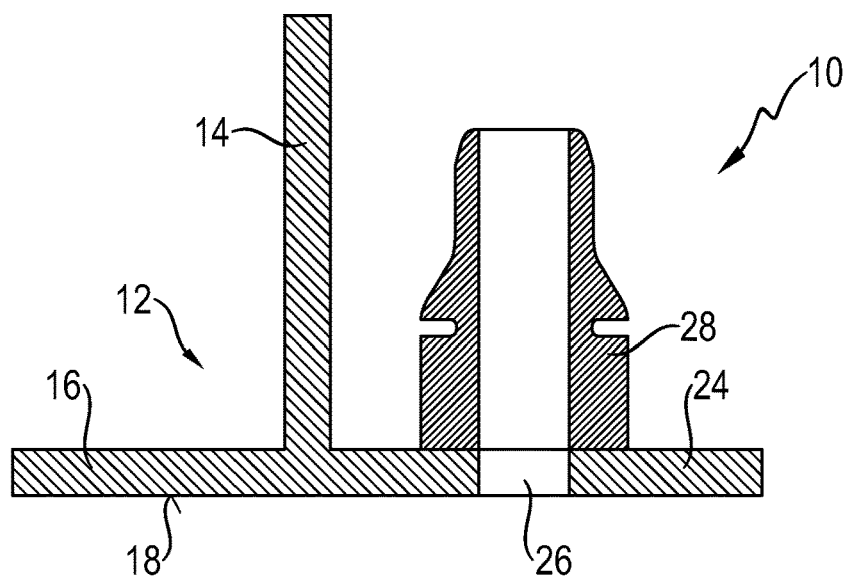

Below, the invention will be explained by way of example with reference to the appended drawings on the basis of preferred exemplary embodiments, wherein the features presented below may in each case individually or in combination represent an aspect of the invention. In the drawings:

FIG. 1 shows a schematic perspective exploded illustration of a part of a battery housing, FIG. 2 shows a schematic perspective view of the battery housing from FIG. 1 in an assembled state, FIG. 3 shows a schematic perspective exploded illustration of another part of the battery housing, and FIG. 4 shows a schematic sectional view of the battery housing from FIG. 3 in an assembled state, and FIG. 5 is a cross-sectional view through one attachment opening of the battery housing, wherein a straight version of an attachment piece is shown in solid lines and an angled version of an attachment piece is shown in broken lines.

DETAILED DESCRIPTION OF THE INVENTION

The battery housing 10 for a motor vehicle battery of a motor vehicle that is illustrated in FIG. 1 has a housing body 12 which is substantially in the form of a rectangular tube profile and in whose interior space battery cells can be accommodated. The housing body 12 has two housing walls 16 which are connected to one another via lateral connecting walls 14 and which, in the illustrated exemplary embodiment, form a base and a top of the housing body 12. The housing walls 16, which are spaced apart from one another in the vertical Z direction via the connecting walls 14, may be provided on their outwardly facing surface 18 with at least one cooling plate 20. The respective cooling plate 20 may be formed from two sheets which are connected to one another and between which a cooling channel 22 can be formed, as shown in FIG. 5. In the plane of the respective housing wall 16, there projects at the connection to the same connecting wall 14 in each case at least one attachment projection 24. The respective attachment projection 24 projects outward, that is to say away from the interior space of the housing body 12, and extends the surface 18 of the associated housing wall 16.

When the cooling plate 20 has been mounted onto the surface 18 of the associated housing wall 16, a part of the cooling plate 20 can likewise bear on that part of the surface 18 which is formed by the attachment projection 24, as is illustrated in FIG. 2. In the attachment projection, there is formed at least one attachment opening 26, which can be connected fluidically to the cooling channel 22 of the cooling plate via a corresponding connecting opening formed in the cooling plate 20.

As is illustrated in FIG. 3 and FIG. 4, there may be fastened on that side of the attachment projection 24 which faces away from the cooling plate 20 an attachment piece 28, via which the attachment opening 26 and the fluidically connected cooling channel 22 can be connected to a fluid line, in particular in the form of a coolant hose. The fluid line may be part of a coolant circuit with the aid of which the battery housing 10 can be temperature-controlled. The attachment piece 28 may be of straight or angled form in order to be able to route the fluid line connected to the attachment piece 28 along the connecting wall 14 in an installation space-saving manner.

What is claimed is:

1. A battery housing for a motor vehicle battery of a motor vehicle, said battery housing comprising:
   a housing body including (i) at least one planar and horizontal housing wall lying in a horizontal plane, and (ii) at least one planar and vertical housing wall lying in a vertical plane that is orthogonal to the horizontal plane, the vertical housing wall being connected to the horizontal housing wall,
   a cooling plate which is separate from the horizontal housing wall and bears on an outwardly facing surface of the horizontal housing wall and which is configured to control a temperature of the motor vehicle battery, the cooling plate lying parallel to the horizontal housing wall,
   an attachment projection of the horizontal housing wall which projects along the horizontal plane beyond the vertical housing wall such that the attachment projection overhangs the vertical housing wall, and
   an overhanging portion of the cooling plate which overhangs the vertical housing wall,
   wherein the attachment projection has at least one attachment opening which communicates with a cooling channel formed in the overhanging portion of the cooling plate.

2. The battery housing as claimed in claim 1, wherein the cooling channel is formed in a cooling plane which is substantially parallel to the outwardly facing surface of the horizontal housing wall, and wherein the cooling channel is connected to the respective attachment opening via a connecting opening which runs transversely with respect to the cooling plane.

3. The battery housing as claimed in claim 1, further comprising an attachment piece connected to the attachment opening on a bottom side of the attachment projection facing away from the cooling plate, wherein the attachment piece is configured to be attached to a fluid line.

4. The battery housing as claimed in claim 3, wherein the attachment piece is of straight form for attaching a coolant hose substantially perpendicular to the cooling plane of the cooling plate.

5. The battery housing as claimed in claim 3, wherein the attachment piece is of angled form for attaching a coolant hose substantially parallel to the cooling plane of the cooling plate and substantially perpendicularly to a projection direction of the attachment projection.

6. The battery housing as claimed in claim 1, wherein said horizontal housing wall has two or more different and mutually offset attachment projections for attaching two or more different, separately formed cooling plates.

7. The battery housing as claimed in claim 1, further comprising two mutually offset horizontal housing walls connected to one another via connecting walls, wherein said horizontal housing walls extend in a substantially parallel manner with respect to one another, wherein each of said horizontal housing walls have at least one of said attachment projections which project in the respective plane of the horizontal housing wall, and, on both outwardly facing surfaces of the respective horizontal housing wall, at least one said cooling plate bears on the surface of the horizontal housing wall.

8. The battery housing as claimed in claim 7, wherein all of the attachment projections project in only exactly one projection direction.

9. The battery housing as claimed in claim 1, further comprising either a common attachment projection or separate attachment projections, which are spaced apart from one another, for feeding of coolant into the cooling channel of the cooling plate and for discharge of coolant from the cooling channel of the cooling plate.

10. The battery housing as claimed in claim 1, wherein, excluding the at least one attachment projection, the housing body is of cuboidal form.

* * * * *